3,559,174
CARD VERIFICATION SYSTEM

Filed Sept. 18, 1967

INVENTORS
STEPHEN T. BRAUNHEIM
GEORGE J. REBANE

ATTORNEY

United States Patent Office 3,559,174
Patented Jan. 26, 1971

3,559,174
CARD VERIFICATION SYSTEM
Stephen T. Braunheim, Los Angeles, Calif. (2024 Lombardy Drive, La Canada, Calif. 91011), and George J. Rebane, Alhambra, Calif. (3003 N. Auburn Court, Santa Susana, Calif. 93063)
Filed Sept. 18, 1967, Ser. No. 668,488
Int. Cl. H04q 9/00
U.S. Cl. 340—149　　　　　　　　　　　　　7 Claims

ABSTRACT OF THE DISCLOSURE

A verification system for credit cards, security area key cards, or the like in which verification is accomplished by circuit continuity through a first group of manually-selected switches, the positions of which represent a number preassigned to and retained by the rightful holder of the card, and a second group of switches actuated by randomly positioned holes or protrusions on the card surface. A modular random circuit card positioned between the first and second groups of switches may be replaced whenever it is desired to alter the random position of the switch group actuated by the card.

---

Card verification devices are presently in great demand. Since the advent of the credit card, there is a continual and growing concern that the credit card being presented may have been found or stolen from the rightful owner, thus generating a great potential liability to either the agency accepting a credit card or to the rightful owner who neglected to report a missing credit card.

Many systems are presently in use for the protection of the acceptor of a credit card, and for card verification. Most of these systems involve the use of a central verification agency and, in some cases, large digital computing systems incorporating costly and complicated memory or storage devices are utilized. Other verification devices involve the use of closed-circuit television devices, which transmit an image of the card holder to a central agency which compares that image with a photoreproduction on file. Thus, many of the present verification systems are complex and costly, and often require one or more full-time employees to be available for the purpose of verifying cards.

The verification system described herein is extremely simple, inexpensive, and reliable. It is self-contained, does not require complex computer systems or personnel located at a central agency, and does not require costly card modifications such as is required for cards having hidden elements which actuate magnetic or optical sensors.

Briefly described, the verification system which is useful for credit cards, security area key cards, or the like, involves the comparison of data, preferably in the form of a preassigned number, retained by the rightful card holder with corresponding data carried on the card in such random form that it cannot be identified by the most rigid examination. The card holder introduces his retained data into a first bank of switches and inserts the card into the device to actuate a second bank of switches responsive to holes or protrusions on the card surface. If the card data corresponds with the introduced data, circuit continuity will operate an indicating device. A modular random circuit contained on a replaceable circuit card is inserted between the first bank and second bank of switches and may be replaced whenever it is desired to alter the random positions of the switch group actuated by the card, such as whenever it is desired to issue new cards. The verification system is provided with a test circuit for checking the operability of the indicator; it is provided with a delay device which will restrict attempted verifications to approximately four per minute so that it would be practically impossible to determine the preassigned data from a card by attempting to sequence through all the available combinations in the first bank of switches; and is further provided with means to break the verification circuit if a card of improper thickness is inserted into the device.

The detailed description of the invention will describe a verification system as being used for the verification of credit cards. As the description continues, it will be apparent that the concept is useful for other card verification, and that the system may be used as an input device for other more complex systems. In the drawings which illustrate a preferred embodiment of the invention:

Figure 1:
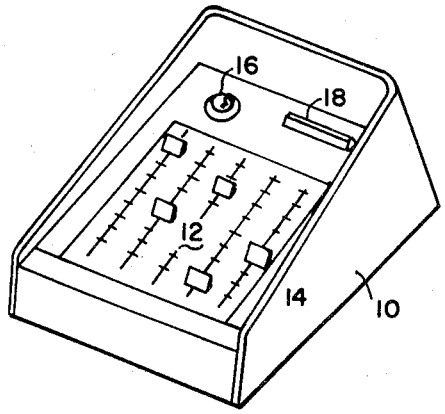
FIG. 1 is an illustration in perspective of the credit card verification unit.

FIG. 1 illustrates in perspective an instrument that may be used for credit card verification. This instrument comprises a housing 10, the top surface of which contains a panel 12 having five decade switch controls 14. The top surface of housing 10 also contains an indicator light 16 and a slot 18 into which a credit card may be inserted. In the operation of such a device, the credit card holder who has previously been assigned a number, will insert that number into the switches on panel 12. With five such decade switches, it is apparent that a total of 100,000 different numbers may be preassigned. The credit card that is inserted into slot 18 is provided with punched holes, or protrusions, which actuate switches within housing 10. If the actuated switches correspond with the number manually inserted into panel 12, indicator light 16 will indicate the circuit continuity and a verification.

Figure 2:
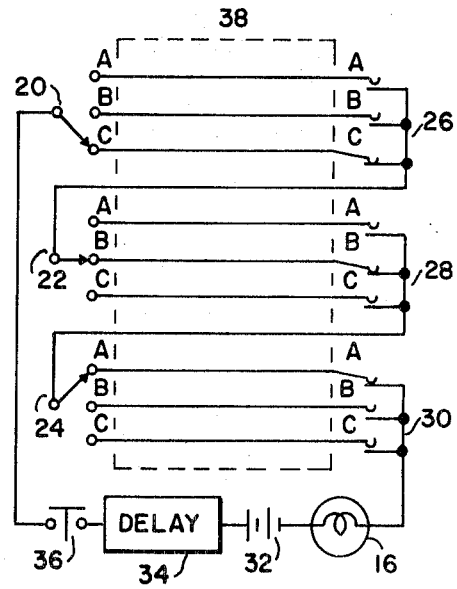
FIG. 2 is a simplified schematic diagram presented to simplify the understanding of the principles involved.

A simplified schematic of the circuitry contained in the housing of FIG. 1 is illustrated in FIG. 2. In FIG. 2 it is assumed that the switch panel contains only three switches of three poles each; or a total of $3^3$ or 27 combinations. It will be assumed that the card holder inserts his preassigned number into switches 20, 22, and 24, and it will be further assumed that the card holder has selected switch positions 20C, 22B, and 24A. When a credit card is inserted into slot 18 of the verification device, the credit card will actuate switches 26, 28, and 30, and if the holes or protrusions on the credit card correspond with the number inserted by the card holder, the card will actuate contacts 26C, 28B, and 30A.

In the circuit shown in FIG. 2, all of the stationary contacts of switch 26 are connected together and to the moveable arm of switch 22. Similarly, all of the stationary contacts of switch 28 are connected together and to the moveable arm of switch 24. All of the stationary contacts of switch 30 are connected together and are coupled through an indicating light 16, a power source which may be a battery 32, a delay device 34, and a switch 36, to the moveable contact of switch 20. Thus, when a card actuates switches 26, 28, and 30, to correspond with the numbers inserted into switches 20, 22, and 24, there is a continuity through the circuit and indicator light 16 will become activated when switch 36 is depressed. In the instrument illustrated in FIG. 1, switch 36 is preferably positioned at the bottom of slot 18 so that a credit card inserted into slot 18 will not only actuate switches 26, 28, and 30, but will also depress switch 36 to test for continuity through the circuit.

Delay device 34 may either be a mechanical or electrical delay which will permit only one continuity test, or verification attempt, in a period of approximately 15 seconds. The delay device 34 is provided so that a person finding a lost card cannot readily determine the preassigned numbers by inserting the card into a verification device and dialing through the various combinations of switches 20, 22, and 24, to determine the preassigned number.

The section outlined by dashed lines between switches 20, 22, and 24, and switches 26, 28, and 30, represent a random circuit 38, which connects the manually selected switches with the card actuated switches. In FIG. 2, random circuit 38 has been greatly oversimplified by connecting the switch contact 20A with contact 26A, 20B with 26B, etc. Such a straight line connection is not practical since it would be a simple task for a card finder to determine the preassigned numbers from the positions of the holes or protrusions on the surface of a credit card. This objection is overcome by arranging the circuit connections of random circuit 38 in a truly random form as illustrated in FIG. 3.

Figure 3:
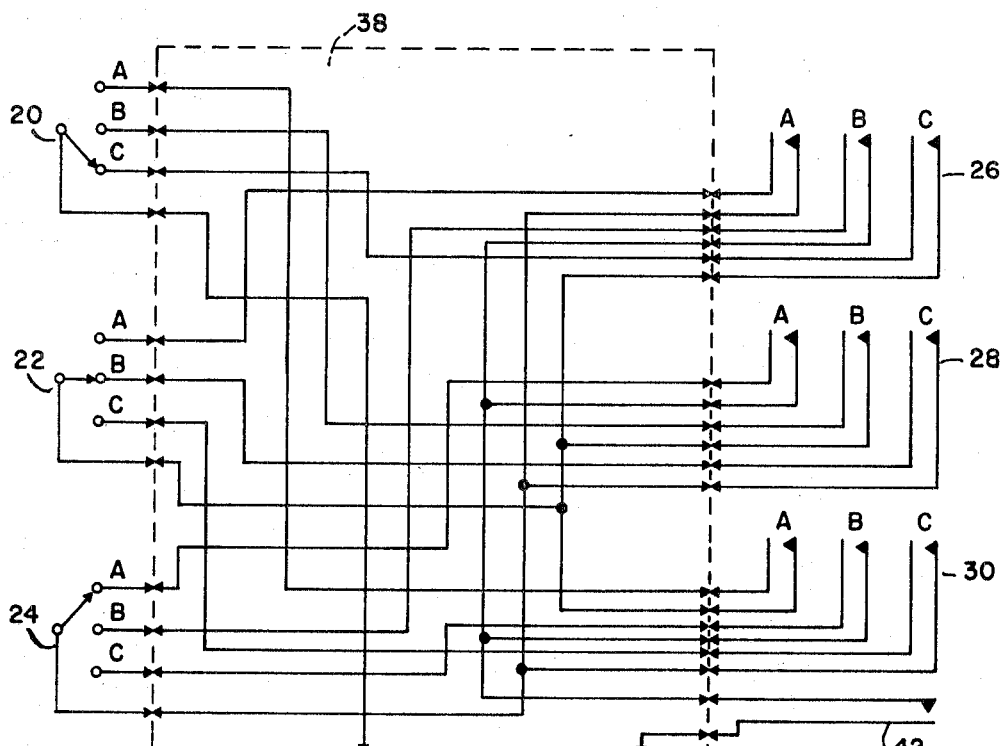
FIG. 3 is a schematic diagram of a verification system such as may be used with the instrument illustrated in FIG. 1.

The circuit diagram of FIG. 3 is essentially identical with that shown in FIG. 2, except the random circuit 38 outlined by the dashed line, effectively scrambles the connections between switches 20, 22, and 24, with the switches actuated by the credit card. Thus, contact A of switch 20 is shown to be interconnected with contact A of switch 30; contact B of switch 20 is shown to be connected with contact B of switch 28, etc. Accordingly, if the holder of a credit card manually selected switches 20C, 22B, and 24A, and if the credit card inserted into slot 18 closed switches 26C, 28C, and 28A, a continuity between the switches would be established. Therefore, upon actuation of switch 36, there would be continuity through the circuit including a switch 42 which will be explained in connection with FIGS. 4 and 5, battery 32, and lamp 16; and the indicator lamp 16 would become lighted to indicate such a continuity and a verification. After indicator lamp 16 has shown continuity through the circuit, and after switch 36 has been released, delay device 34 which contains a 15 second timer will open the line between switch 36 and indicator lamp 16 so that another attempted verification cannot be made for another 15 seconds. As previously explained, such a delay device will prevent a credit card finder from readily determining the preassigned number by dialing through the various combinations of switches 20, 22, and 24.

In order to prevent embarrassment of a credit card holder by the failure of indicator lamp 16, a lamp test circuit is provided by inserting a single-pole, single-throw switch 40 across the circuit containing battery 32 and indicator 16 so that the closing of switch 40 will actuate indicator 16 without the requirement for continuity between the various switch elements of the verification device. Thus, switch 40 will not only test the operability of indicator lamp 16, but also the operation of battery 32.

It is to be noted that random circuit 38 is preferably a printed circuit board provided with contacts adapted to be inserted into a multi-contact receptical within the verification devices. Therefore, whenever it is desired to issue new credit cards having holes or protrusions located at different points on the surface, but still representing the original preassigned number, it is merely necessary to insert a new random circuit 38 into the verification device. Such a new random circuit 38 would merely select different ones of switches 26, 28, or 30, and could, if desired, take the form of the random circuit 38 illustrated in FIG. 2.

The circuits illustrated in FIGS. 2 and 3 have been simplified in order to simplify the explanation of the device. In actual practice, the manually selected switches 20, 22, and 24, would be replaced with approximately five decade switches as illustrated in FIG. 1. The card selection switches 26, 28, and 30, would be replaced with a matrix of 50 closely spaced switches such as shown in either FIG. 4 or 5.

Figure 4:
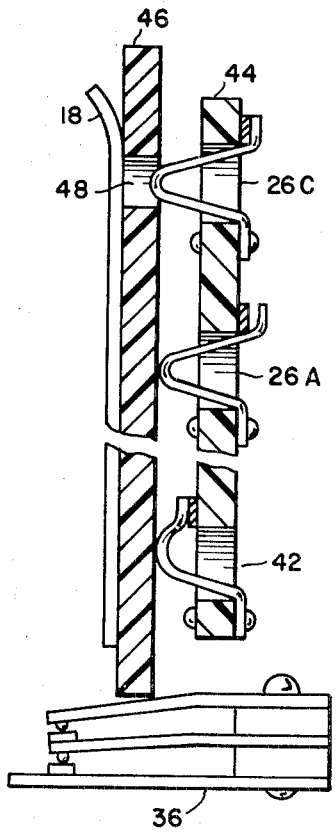
FIG. 4 is a cross section view of the switches actuated by perforations in a card.
Figure 5:
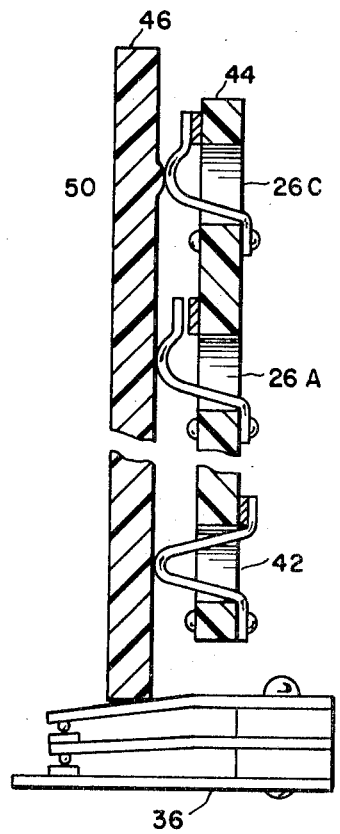
FIG. 5 is a cross section view of the switches actuated by protrusions on the surface of a card.

FIGS. 4 and 5 illustrates, in cross section, the details of the card-actuated switches. In FIG. 4, a card 46, having a plurality of randomly positioned holes 48, is inserted into slot 18 of the verification device. A circuit board 44 positioned adjacent to card 46, and substantially parallel thereto, contains a plurality of spring contact members which extend through circuit board 44 and contact card 46. If the position of a contact member corresponds with a hole in card 46, the contact member will close. FIG. 4 shows that hole 48 in card 46 is in position to accommodate the contact member of switch 26C so that the contact will close. Since there is no hole in card 46 to accept the contact member of switch 26A, that contact member will remain open.

Since, as shown in FIG. 4, the contact members close only on correspondence with holes in card 46, it is conceivable that a person could insert a very thin card into slot 18 to actuate switch 36, thus allowing all contact members to close and show a verification continuity through the circuitry. To prevent this possibility, switch 42 is provided to sense the thickness of an inserted card. The contact member of switch 42 can only close when an adequately thick card is inserted; a thin card will open switch 42 and, as shown in the circuitry of FIG. 3, a continuity cannot occur.

FIG. 5 illustrates a cross section of a switch matrix for actuation by a protrusion 50 on a card 46. Here the contact member of switch 26C is closed by a protrusion and the contact member of switch 26A remains open by the absence of a protrusion. Since all switches could be closed, and a continuity developed by a card of extra thickness, switch 42 is provided to open in the event an extra thick card is inserted into slot 18 to actuate switch 36.

The verification device has been explained for the verification of credit cards. It is apparent that the device may also be used for other purposes such as a card key for the opening of access locks into security areas. For security lock purposes, the indicator lamp 16 may be removed and replaced with an electric door opener or door lock release, and a person having rightful access to such a security area would be required to manually insert a preassigned number into switches 20, 22, and 24, and insert his identification card, suitably coded with randomly positioned protrusions into a slot which actuates switches 26, 28, and 30. Continuity between the manually inserted number and the card actuated switches would thus give access to the security area. If desired, the continuity normally supplied to indicator lamp 16 could also actuate a time clock to record the time when a person entered or left an area. Another important feature of the verification device for security purposes is that the random circuit 38 may be replaced after each working shift, so that an employee who had access to the security area during one shift would be denied access during other shifts.

Since the system makes use of switching circuits, it is apparent that it is adaptable for use as an input device to centralized vertification centers or to more complex computing systems. Further, the manually operated decade switches of FIG. 1 may be adapted to indicate to a central billing office, the amount of a sale after which the verification operation would be actuated to verify the card of the purchaser.

What is claimed is:

1. A card verification system for sensing and indicating a correlation between preassigned data known to and entered by the card owner into the system and corresponding data randomly registered on the card, said system comprising:

a housing having an externally accessible switch panel;
a first plurality of switches, each having a plurality of switch positions controllable from the external surface of said switch panel, the particular selection of said switches representing the preassigned data;

a second plurality of switches mounted within said housing and selectively operable in response to the data randomly registered on said card;

random circuit means removeably located within said housing for randomly coupling the contacts of the switches of said plurality with the contacts of the switches of said second plurality; and delayed indicating means connected across said first and second pluralities for producing a delayed indication of electrical continuity through said random circuit means and said pluralities when the particular selection of said first plurality of switches corresponds with the closure of particular switches in said second plurality.

2. The verification system claimed in claim 1 further including delay means associated with said indicating means for breaking the continuity through said indicating means for a predetermined time after each attempted verification.

3. The verification system as claimed in claim 1 wherein said random circuit means includes a replacable modular circuit.

4. The verification system as claimed in claim 1 further including switch means associated with said second plurality of switches for disconnecting said indicating means upon the sensing of a card of unusual thickness.

5. The verification system as claimed in claim 1 wherein said second plurality of switches includes a circuit board having a matrix of resilient switch contact elements, said board being in juxtaposition with an inserted card whereby said contact elements are actuated by irregularities on the surface of said card.

6. The verification system as claimed in claim 1 further including test circuit means for selectively completing a circuit through said indicating means for testing said indicating means.

7. The verification system as claimed in claim 1 wherein said indicating means includes an electrical power source.

References Cited
UNITED STATES PATENTS

| | | | |
|---|---|---|---|
| 3,450,953 | 6/1969 | Garner | 340—149X |
| 3,403,380 | 9/1968 | Welch | 340—149 |

DONALD J. YUSKO, Primary Examiner